US008500162B2

(12) United States Patent
Moffitt et al.

(10) Patent No.: US 8,500,162 B2
(45) Date of Patent: Aug. 6, 2013

(54) INFLATABLE CURTAIN AIRBAG WITH AN INTEGRATED PILLAR GUIDE

(75) Inventors: Robert Moffitt, Grand Blanc, MI (US); Timothy A. DePottey, Flint, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/335,390

(22) Filed: Dec. 22, 2011

(65) Prior Publication Data

US 2013/0161930 A1 Jun. 27, 2013

(51) Int. Cl.
*B60R 21/213* (2011.01)
*B60R 21/232* (2011.01)

(52) U.S. Cl.
USPC .......................................................... 280/730.2

(58) Field of Classification Search
USPC ........................................................... 280/730.2
IPC .......................................... B60R 21/213,21/232
See application file for complete search history.

(56) References Cited

U.S. PATENT DOCUMENTS

| | | | | |
|---|---|---|---|---|
| 6,152,482 A | * | 11/2000 | Patel et al. ................. | 280/730.2 |
| 6,254,123 B1 | * | 7/2001 | Urushi et al. .............. | 280/730.2 |
| 6,305,707 B1 | * | 10/2001 | Ishiyama et al. .......... | 280/728.2 |
| 6,364,349 B1 | * | 4/2002 | Kutchey et al. ........... | 280/730.2 |
| 6,830,262 B2 | | 12/2004 | Sonnenberg et al. | |
| 6,902,187 B2 | * | 6/2005 | Sonnenberg ............... | 280/730.2 |
| 7,125,038 B2 | * | 10/2006 | Gammill ..................... | 280/728.2 |
| 7,159,896 B2 | * | 1/2007 | Ochiai et al. ............... | 280/730.2 |
| 7,182,366 B2 | * | 2/2007 | Enriquez .................... | 280/730.2 |
| 7,401,805 B2 | * | 7/2008 | Coon et al. ................. | 280/730.2 |
| 7,513,522 B2 | * | 4/2009 | Tanaka et al. .............. | 280/730.2 |
| 7,699,343 B2 | | 4/2010 | Kwak et al. | |
| 8,286,991 B2 | * | 10/2012 | Shimazaki et al. ........ | 280/728.2 |
| 2006/0157958 A1 | * | 7/2006 | Heudorfer et al. ......... | 280/730.2 |
| 2007/0296189 A1 | | 12/2007 | Berntsson et al. | |
| 2010/0127484 A1 | | 5/2010 | Son | |
| 2011/0127755 A1 | * | 6/2011 | Beppu et al. ............... | 280/730.2 |

\* cited by examiner

*Primary Examiner* — Ruth Ilan
*Assistant Examiner* — Joselynn Y Sliteris
(74) *Attorney, Agent, or Firm* — Stoel Rives LLP (57) ABSTRACT

Inflatable curtain airbags deploy smoothly with an integrated pillar guide that minimizes interference with a vehicle pillar. The integrated pillar is a thin piece of semi-flexible, semi-rigid material housed in a pocket that is coupled to a curtain airbag.

28 Claims, 13 Drawing Sheets

INFLATABLE CURTAIN AIRBAG WITH AN INTEGRATED PILLAR GUIDE

TECHNICAL FIELD

The present disclosure relates generally to the field of automotive protective systems. More specifically, the present disclosure relates to inflatable curtain airbags having a deployment guide. The present disclosure also relates to methods of guiding the deployment of inflatable curtain airbags.

BRIEF DESCRIPTION OF THE DRAWINGS

The present embodiments will become more fully apparent from the following description and appended claims, taken in conjunction with the accompanying drawings, which may not be to scale. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other airbag type.

Inflatable curtain airbags may be used to protect the passengers of a vehicle during a side collision or roll-over event. Inflatable curtain airbags typically extend longitudinally within the vehicle and are usually coupled to or next to the roof rail of the vehicle. The inflatable curtain airbag may expand in a collision scenario along the side of the vehicle between the vehicle passengers and the side structure of the vehicle. In a deployed state, an inflatable curtain airbag may cover at least a portion of side windows and a B-pillar of the vehicle. In some embodiments, inflatable curtain airbags may extend from an A-pillar to a C-pillar of the vehicle. In alternative embodiments, inflatable curtain airbags may extend from the A-pillar to a D-pillar of the vehicle.

Inflatable curtain airbags are typically installed adjacent to the roof rail of a vehicle in an undeployed state, in which the inflatable curtain airbag is rolled or folded or a combination thereof and retained in the folded or rolled configuration by being wrapped at certain points along the airbag. In this state, the airbag may be said to be in a packaged configuration. When deployed, the airbag exits the packaged configuration and assumes an extended shape. When extended and inflated, the airbag may be said to comprise a deployed configuration. Thus, an airbag mounting apparatus typically allows for a secure connection between the vehicle and the airbag, yet allows the airbag to change configurations from the packaged configuration to the deployed configuration.

Figure 1A:
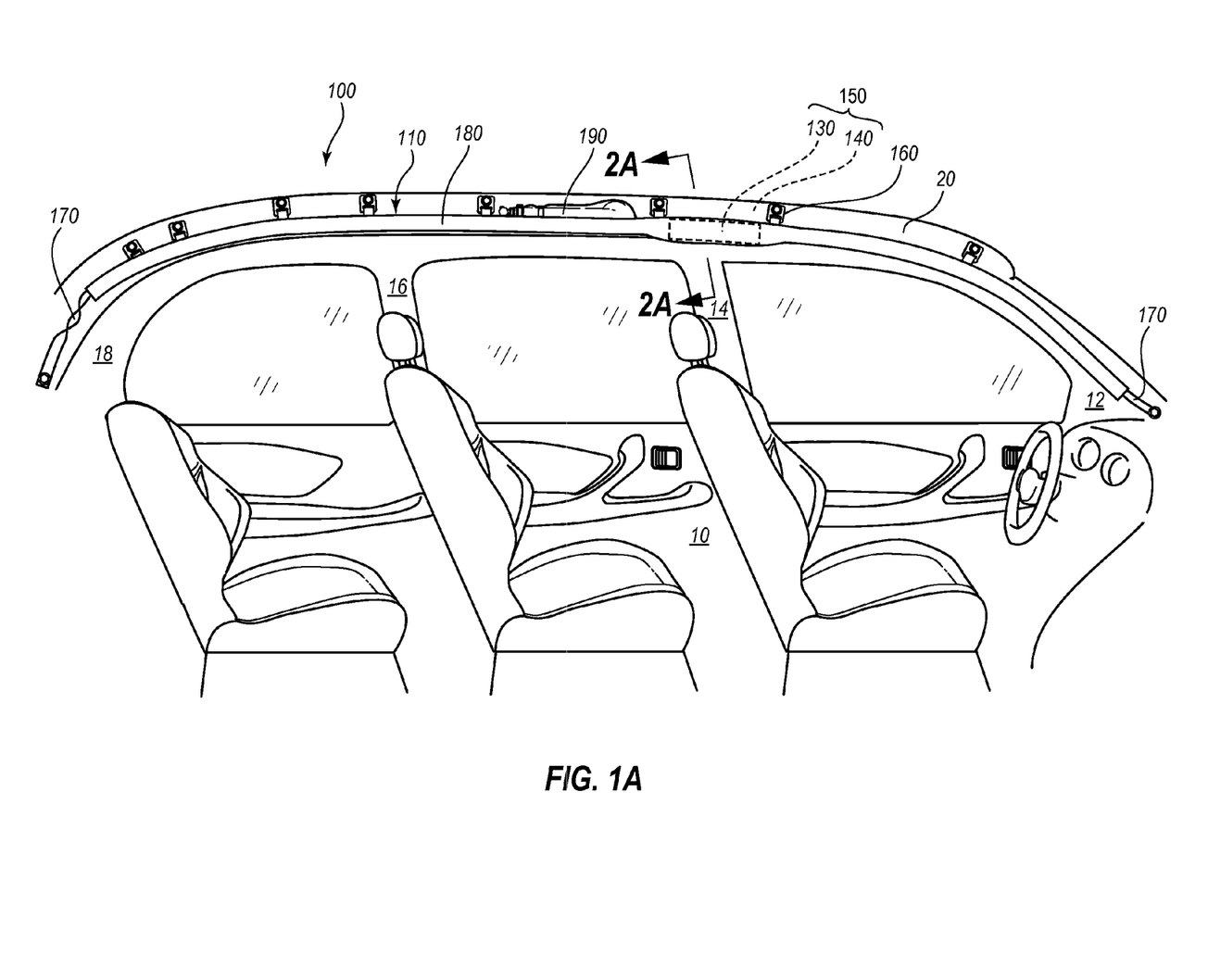
FIG. 1A is a perspective view of one embodiment of an airbag assembly, wherein the airbag assembly comprises a mounting assembly that is coupled to an airbag, wherein the mounting assembly is configured to retain the airbag in a packaged configuration.

FIG. 1A depicts an interior of a side of a vehicle 10 and an airbag assembly 100 that comprises an inflatable side curtain airbag cushion 110. Cushion 110 is mounted adjacent to a vehicle roof rail 20 and extends from an A-pillar 12 to a D-pillar 18. Inflatable curtain airbag 110 also extends past a B-pillar 14 and a C-pillar 16.

FIG. 1A provides a perspective view of airbag assembly 100, wherein inflatable curtain airbag 110 is in a packaged configuration. A bridge 120 couples a pocket 140 to the inflatable curtain airbag 110. A ramp 130 is positioned within pocket 140. Ramp 130 and pocket 140 are referred to together as pillar guide 150. Pillar guide 150 is described in detail with respect to FIGS. 2A-2D and FIGS. 3A-3C. The airbag assembly may also comprise an airbag mounting assembly 160, tethers 170, a wrapper 180, and an inflator 190.

Inflatable curtain airbag 110 is configured to rupture wrapper 180 during deployment such that inflatable curtain airbag 110 can adopt the deployed configuration. Inflatable curtain airbag 110 becomes inflated upon activation of one or more inflators, such as inflator 190, such that the inflatable curtain airbag transitions from the packaged configuration to the deployed configuration. Upon activation, inflator 190 rapidly generates and/or releases inflation gas, which rapidly inflates the inflatable curtain airbag. The inflator may be one of several types, such as pyrotechnic, stored gas, or a combination inflator and may comprise a single or multistage inflator. Tethers 170 are located outside inflatable curtain airbag 110, and in the deployed configuration, the tethers are configured to apply tension to the curtain airbag 110.

Figure 1B:
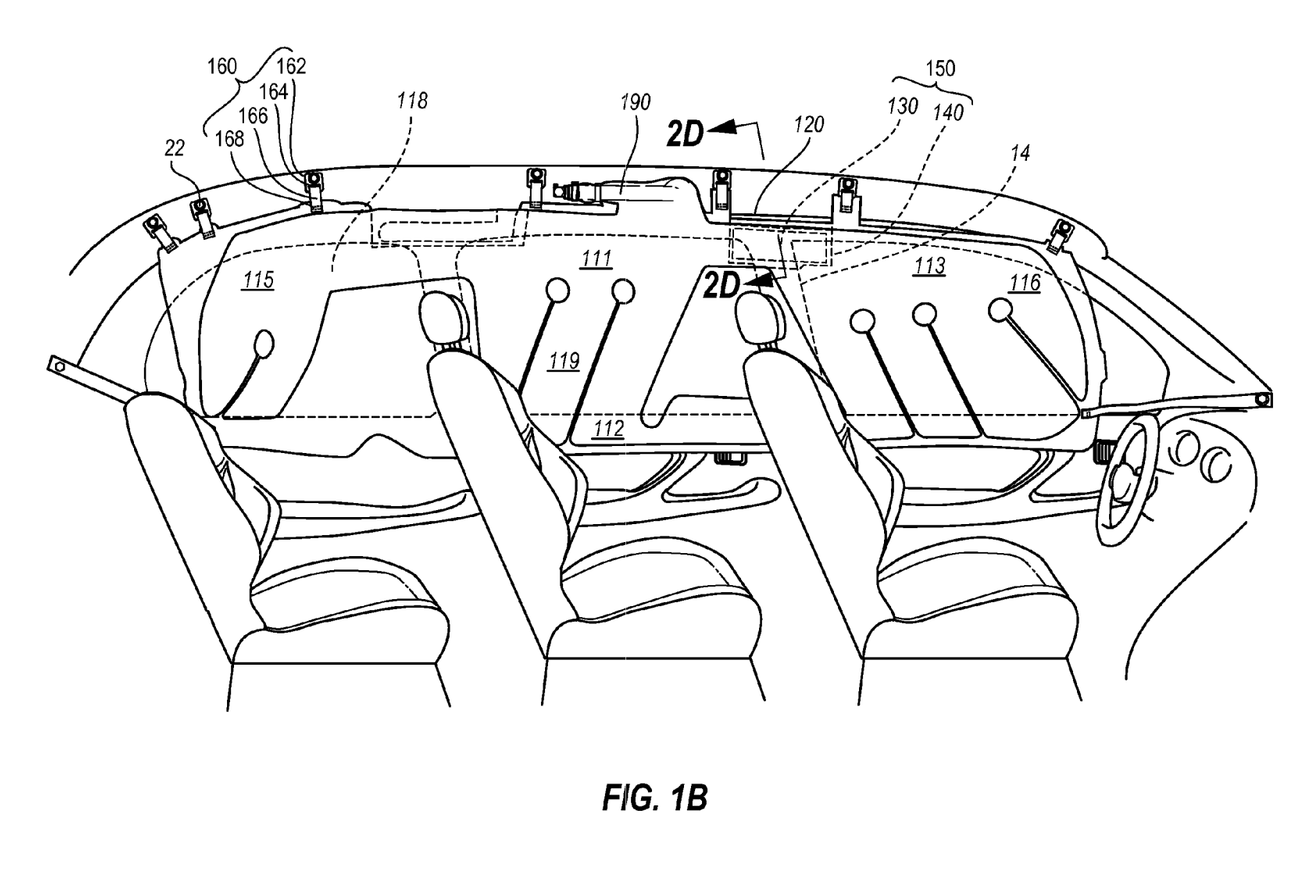
FIG. 1B is a perspective view of the airbag assembly of FIG. 1A, wherein the airbag is in a deployed configuration.

FIG. 1B is a perspective view of airbag assembly 100, wherein inflatable curtain airbag 110 is depicted in a deployed configuration. Inflatable curtain airbag 110 may be described as having an upper portion 111, a lower portion 112, an inboard-facing face 113, an outboard-facing face (not visible) a first end 115, and a second end 116. The faces of inflatable curtain airbag 110 define an interior inflatable void 118, which is in fluid communication with inflator 190. Inflatable void 118 may be divided into inflation cells 119. The faces of inflatable curtain airbag 110 may comprise panels of a woven nylon fabric that are coupled together at a seam or opposing sides that are woven as one-piece.

Upper portion 111 of inflatable curtain airbag 110 is the portion of the curtain airbag that is closest to the headliner of a vehicle when the airbag is in a deployed state. Lower portion 112 is below upper portion 111 when inflatable curtain airbag 110 is in a deployed state, and is closest to a floor of the vehicle. The term "lower portion" is not necessarily limited to the portion of inflatable curtain airbag 110 that is below a horizontal medial plane of the inflatable curtain airbag, but may include less than half, more than half or exactly half of the bottom portion of the inflatable curtain airbag. Likewise, the term "upper portion" is not necessarily limited to the portion of inflatable curtain airbag 110 that is above a horizontal medial plane of the inflatable curtain airbag, but may include less than half, more than half or exactly half of the top portion of the inflatable curtain airbag.

As will be appreciated by those skilled in the art, a variety of types and configurations of inflatable curtain airbag membranes can be utilized without departing from the scope and spirit of the present disclosure. For example, the size, shape, and proportions of the airbag membrane may vary according to its use in different vehicles or different locations within a vehicle such that the airbag may comprise an inflatable curtain cushion; a rear passenger side airbag; a driver's airbag; and/or a front passenger airbag. Also, the cushion membrane may comprise one or more of any material well known in the art, such as a woven nylon fabric. Additionally, the airbag cushion may be manufactured using a variety of techniques such as one piece weaving, cut and sew, or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

A plurality of mounting assemblies 160 may be employed to couple inflatable curtain airbag 110 to a vehicle. Mounting assembly 160 may comprise a mounting member 162 having an aperture 164, and a wrapping member 166 that is connected to airbag cushion 110 via threads 168. A bolt 22 may attach mounting member 162 to vehicle roof rail 20. Mounting assembly 160 may be employed to couple airbag 110 adjacent to a vehicle roof rail 20 or other vehicle structure. As such, a mounting assembly may be said to be a portion of an airbag assembly, which may comprise an inflatable curtain airbag and a mounting assembly.

Airbag assembly 100 may be considered to comprise one or more modular components. A modular component may be defined as a component that is coupled to an inflatable airbag, but is not contiguous with the fabric from which the airbag is formed. A modular component may also be considered to be a sub-assembly of an airbag assembly, wherein the component is coupled to the inflatable airbag after the airbag has been manufactured; however, some components may be coupled to the airbag during airbag manufacture. A modular component may be manufactured before or after the inflatable airbag is manufactured. A modular component need not be suitable for use with more than one type of inflatable airbag or species of airbag. For example, a modular component may have a predetermined length that is intended for use in a specific vehicle make and model and with a predetermined airbag design, such that the component may not be suitable for use in a different vehicle make and model or with a different inflatable curtain airbag. The modular component may be located at or coupled to a periphery of the airbag, such that the component may be called a "peripheral component" or a "peripheral modular component". Further, the modular component may be called a "feature," "attachable feature," or "separate feature". Mounting assembly 160 and tethers 170 can be considered modular components of inflatable curtain airbag assembly 100. In other embodiments, modular components may include external or internal vents, such as cinch tubes, internal tethers, baffles, and/or diffusers.

FIG. 1B shows inflatable curtain airbag 110 coupled to pocket 140 via a bridge 120. Also, FIG. 1B shows that, upon deployment of inflatable curtain airbag 110, pillar guide 150 is deployed outboard with respect to inflatable curtain airbag 110 such that pocket 140 is facing the outboard-facing face (not visible) and spans over a top of a B-pillar 14 of the vehicle. The function of pillar guide 150 is best understood with references to FIGS. 2A-2D.

Figure 2A:
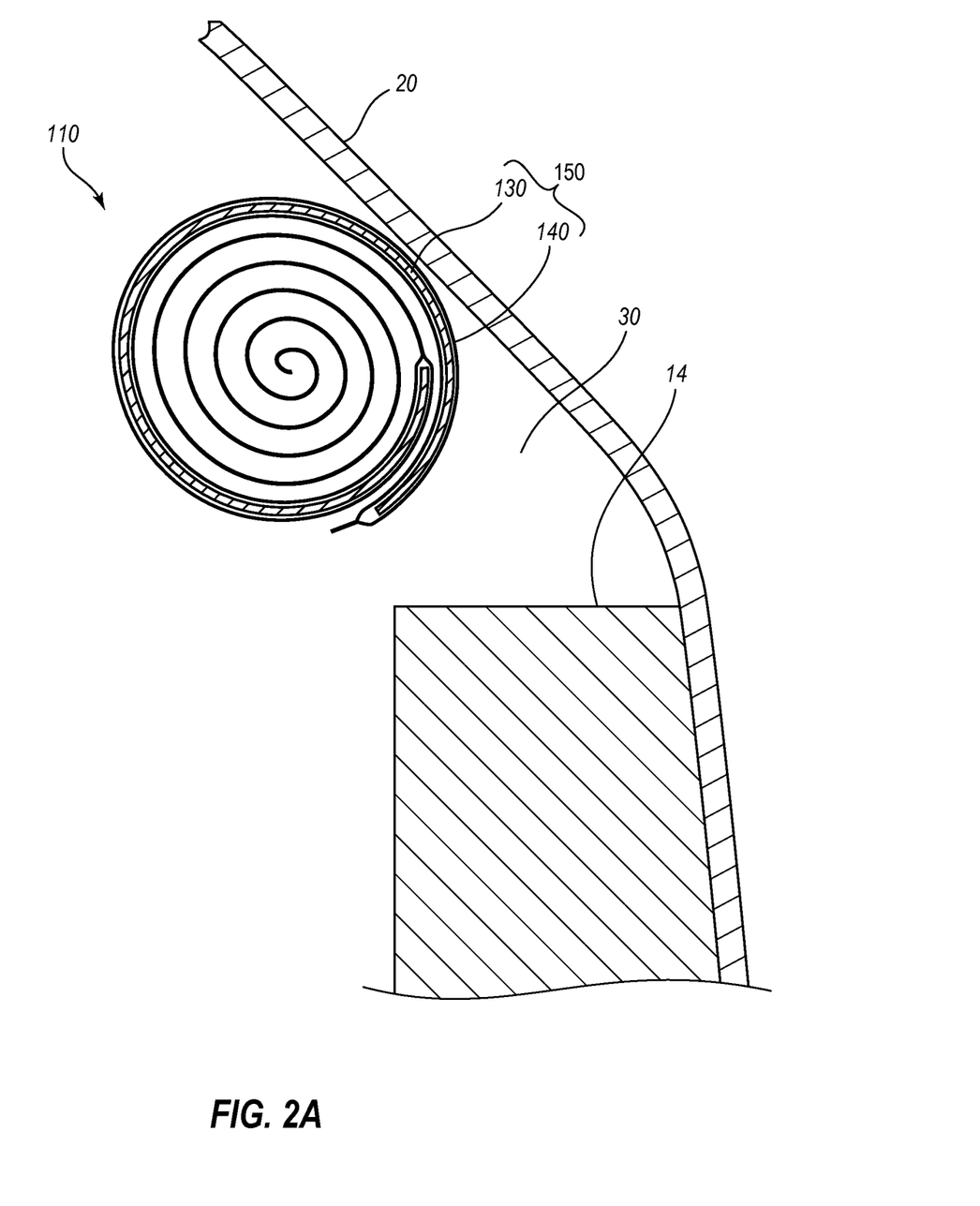
FIG. 2A is a cross-sectional view of an inflatable curtain airbag as shown in FIG. 1A and as taken along cutting line 2A-2A.
Figure 2B:
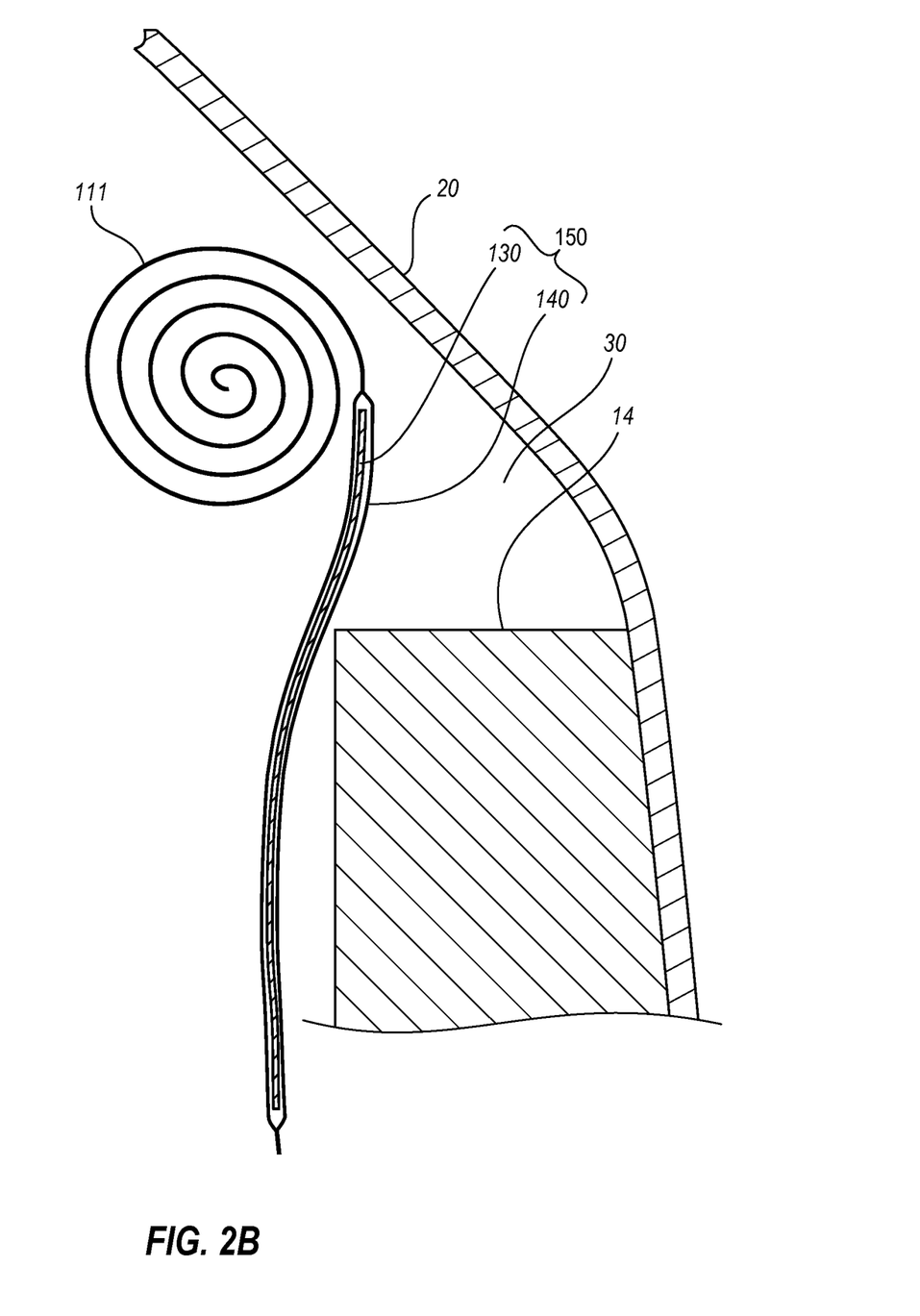
FIG. 2B is a cross-sectional view of the inflatable curtain airbag shown in FIG. 2A after the ramp has been positioned adjacent to a pillar.
Figure 2C:
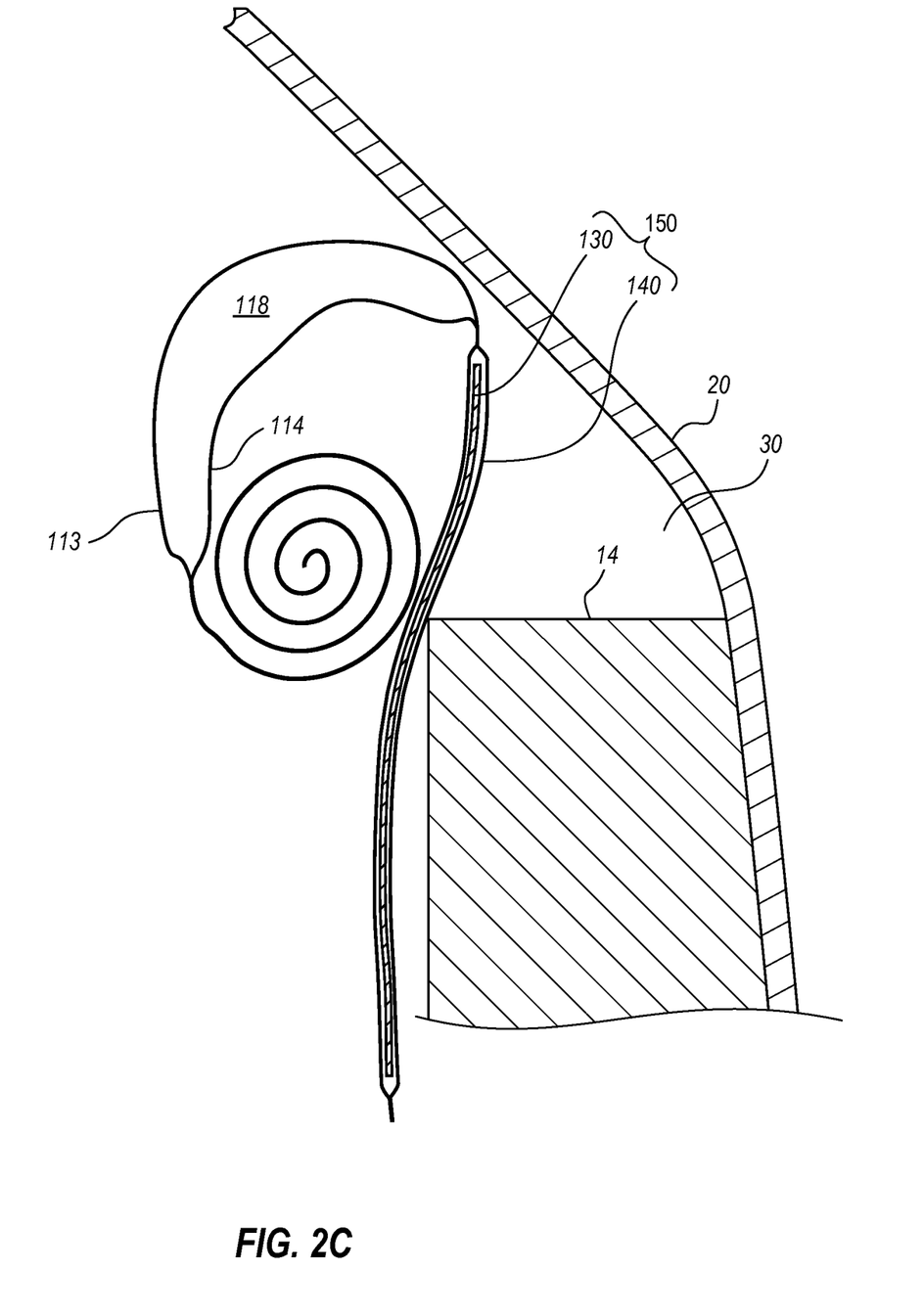
FIG. 2C is a cross-sectional view of the inflatable curtain airbag shown in FIGS. 2A-2B as the airbag begins to expand.
Figure 2D:
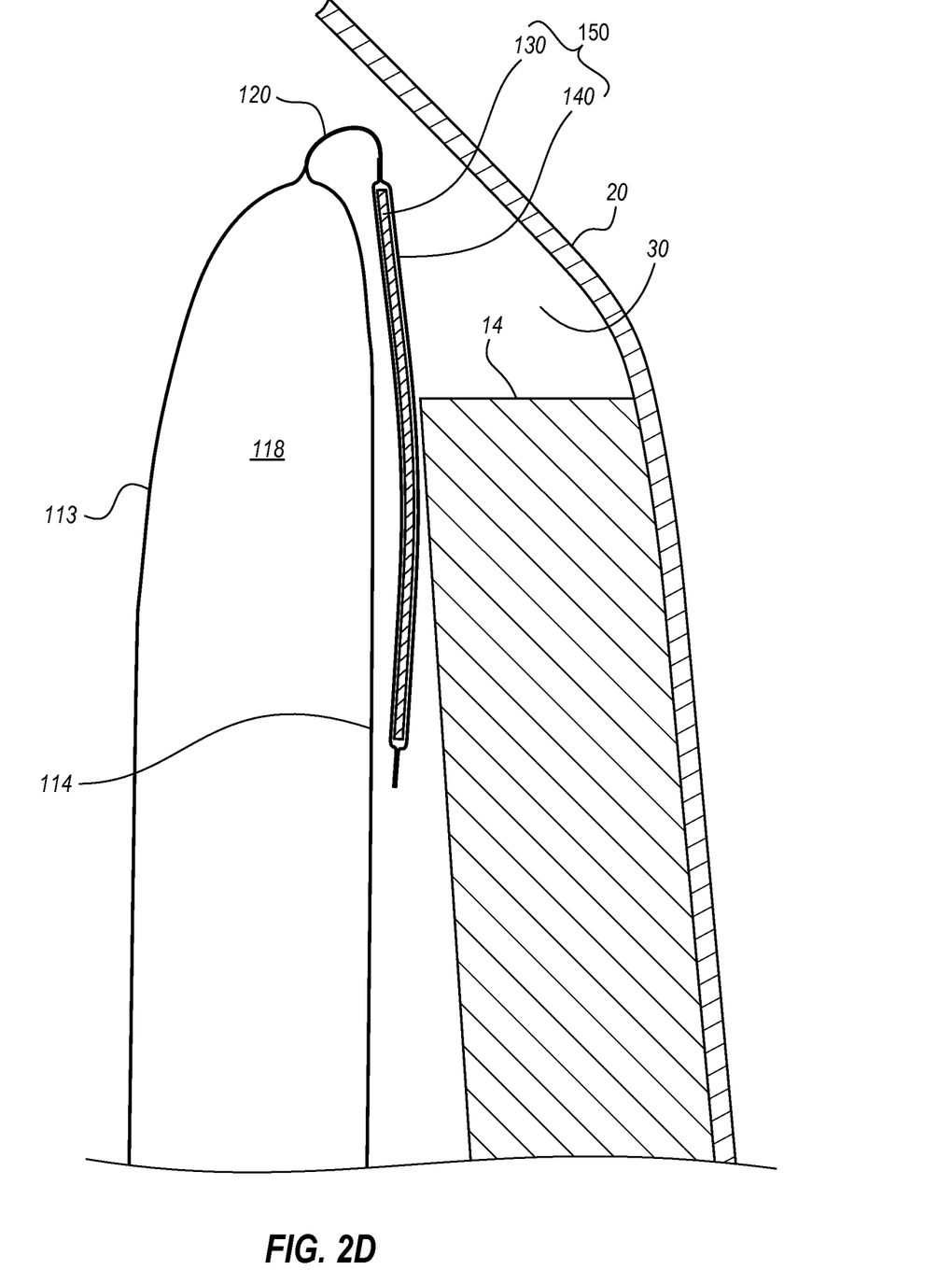
FIG. 2D is a cross-sectional view of the inflatable curtain airbag shown in FIGS. 2A-2C after the airbag has expanded as shown in FIG. 1B and as taken along cutting line 2D-2D.

FIGS. 2A-2D depict the sequential deployment of the portion of curtain airbag 110 adjacent to pillar 14. FIG. 2A, provides a cross-sectional view of inflatable curtain airbag 110, before deployment. FIG. 2D provides a cross-section view taken along cutting line 2D-2D of curtain airbag 110, as shown in FIG. 1B, after full deployment. FIGS. 2B-2C show the intermediate steps.

In FIG. 2A, curtain airbag 110 is positioned above and adjacent to B-pillar 14 and is ready for deployment. The upper portion of curtain airbag 110 is rolled or folded around the lower portion when the assembly is stored and ready for use. Ramp 130 and pocket 140 are also wound around airbag cushion 110. Because ramp 130 is semi-flexible, pillar guide 150 can be rolled or folded, as shown, in accordance with a conventional process for rolling or folding a side curtain airbag that lacks a component such as pillar guide 150.

FIG. 2B shows curtain airbag 110 during initial deployment and the position of pillar guide 150 relative to void 30. Void 30 is the space defined by the top of B-pillar 14 and headliner 20. In the stage shown in FIG. 2B, pillar guide 150 deploys (or unrolls) before curtain airbag 110. Ramp 130 and pocket 140 have a length that permit them to extend over void 30 above B-pillar 14 and along B-pillar 14, as shown. During a curtain deployment, pillar guide 150 guides curtain airbag 110 by acting as a "ramp" over B-pillar 14 such that the B-pillar 14 and vehicle trim do not interfere with the deployment of curtain airbag 110. Because ramp 130 is non-inflatable and semi-flexible, it smoothly springs into position without binding on the top of B-pillar 14 and gas moves quickly to curtain airbag 110. In addition to being sufficiently flexible to be folded or rolled around upper portion 111 when assembly 100 is stored and mounted for use, ramp 130 is sufficiently flexible to be unfolded or unrolled upon deployment of the inflatable curtain and to have a relatively vertical orientation.

FIG. 2C shows curtain airbag 110 beginning to expand, which causes it to unroll. Pillar guide 150 continues to extend over void 30 above B-pillar 14 and along B-pillar 14. Because ramp 130 is non-inflatable and semi-rigid, it prevents curtain airbag 110 from entering void 30, and pillar guide 150 guides the deployment of curtain airbag 110. The rigidity of ramp 130 is sufficient to enable curtain airbag 110 to push against ramp 130 via pocket 140 without being pushed substantially into void 30. For example, pillar guide 150 is not pushed into void 30 in a manner that interferes with the expansion of curtain airbag 110 as curtain airbag 110 unfolds or unrolls. While pillar guide 150 may be pushed into a portion of void 30, pillar guide 150 spans across the trim that defines an opening into void 30 so that it is not necessary to fill void 30.

FIG. 2D shows curtain airbag 110 fully inflated. Curtain airbag 110 has an outboard-facing face 114 that faces toward pocket 140. The sequential views provided by FIGS. 2A-2D show that pillar guide 150 does not interfere with the deployment of curtain airbag 110 other than preventing interference with a pillar or vehicle trim.

Figure 3A:
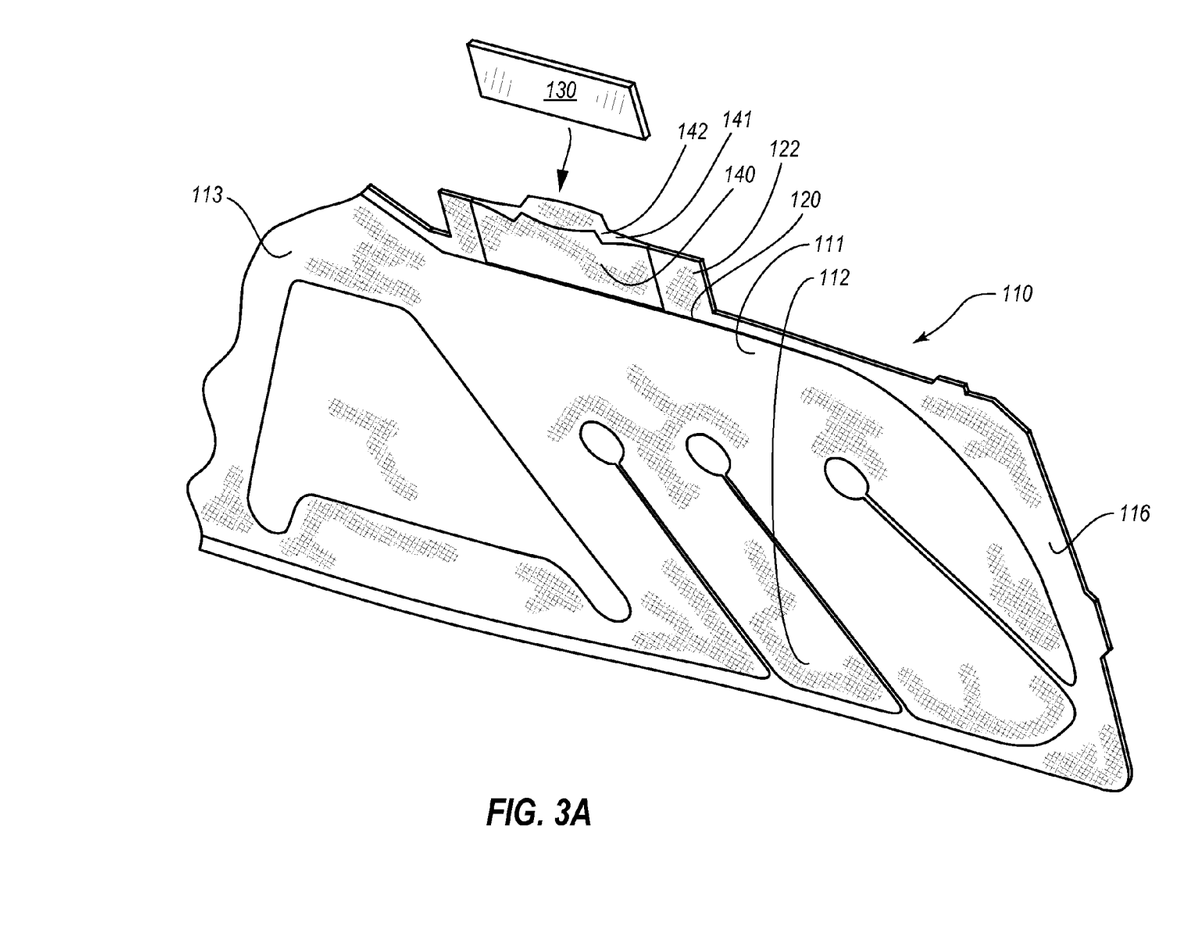
FIG. 3A is a perspective view of a ramp ready to be placed in a pocket of the inflatable curtain airbag.
Figure 3B:
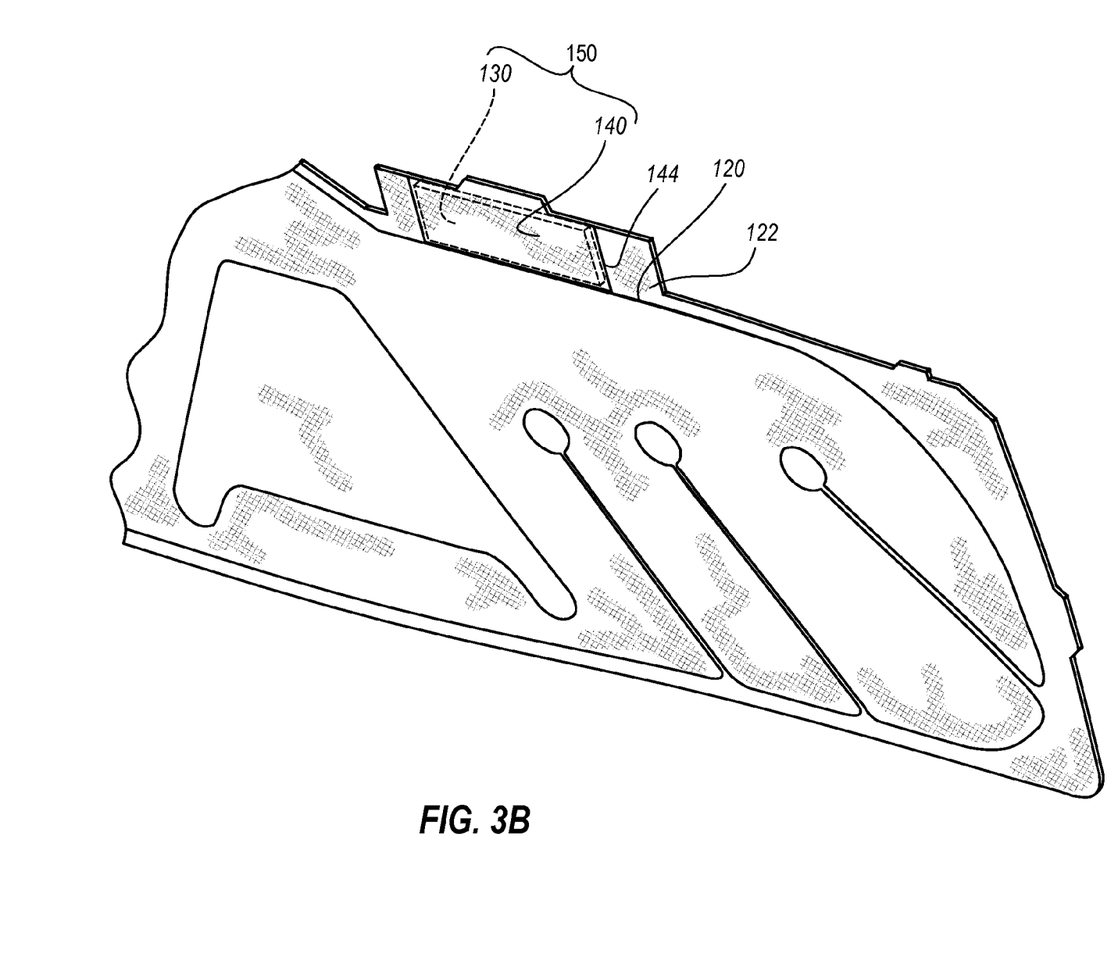
FIG. 3B is a perspective view of an inflatable curtain airbag with a ramp in a pocket before the pocket has been sewn closed.
Figure 3C:
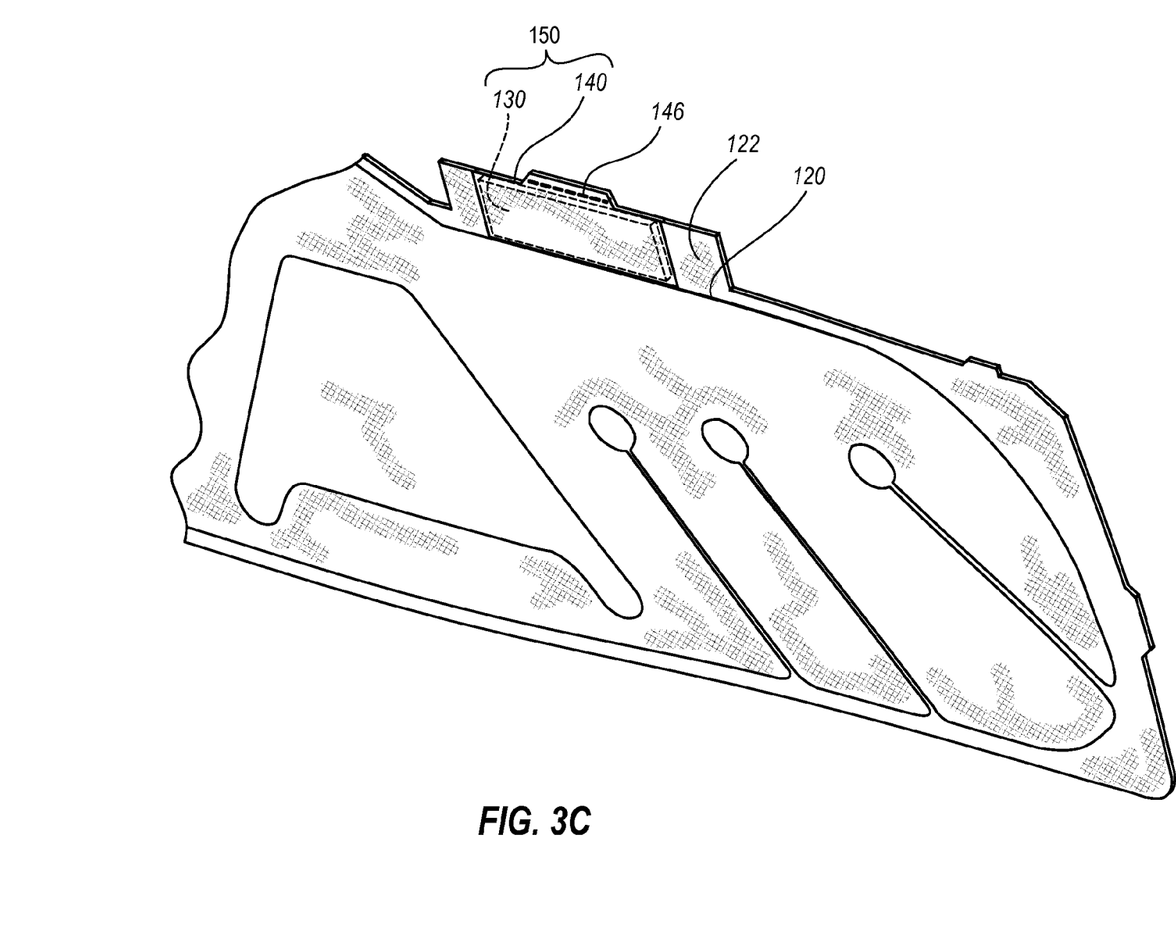
FIG. 3C is a perspective view of an inflatable curtain airbag with a ramp sewn into a pocket.

FIGS. 3A-3C show a method of manufacturing curtain airbag 110. FIG. 3A shows opposing sides 141 of pocket 140 located in extension 122 of inflatable curtain airbag 110. FIG. 3A also shows ramp 130 positioned for insertion into pocket 140 via opening 142. FIG. 3B shows ramp 130 positioned in pocket 140 and confined by the perimeter 144 of pocket 140 other than at opening 142. FIG. 3C shows stitching 146 being used to confine ramp 130 within pocket 140 to yield pillar guide 150. Stitching 146, welding, adhesives are each examples of a closure that is a confining feature used to close opening 142. Similarly, perimeter 144 of pocket 140 may be defined by stitching, gluing or any other way of joining opposing sides together that are known in the art.

Figure 4:
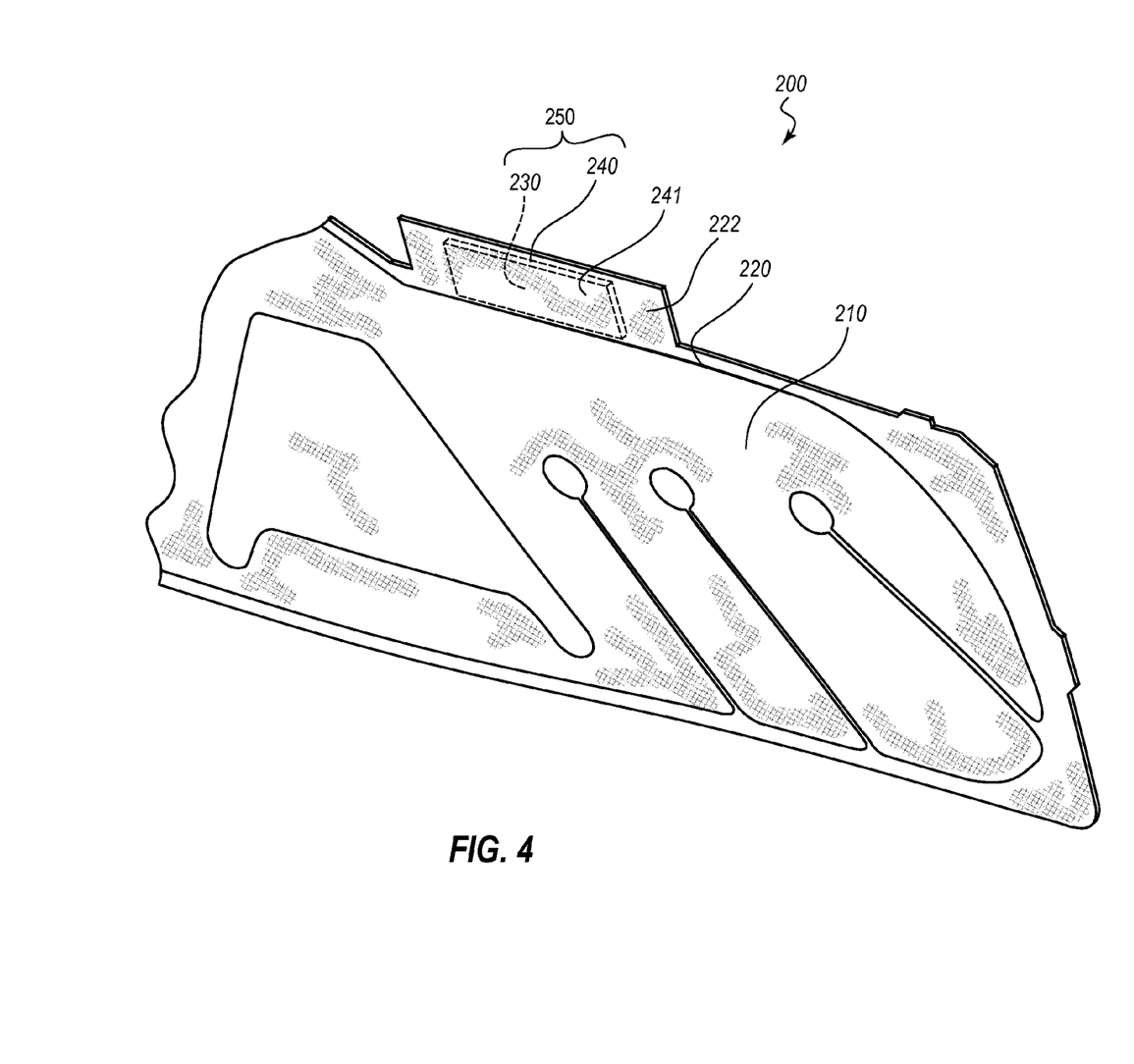
FIG. 4 is a perspective view of another embodiment of an inflatable curtain airbag with a pocket that was woven to enclose a ramp.

FIG. 4 depicts another embodiment of a curtain airbag at 210. FIG. 4 shows a pillar guide 250 comprising a ramp 230 in a pocket 240 of curtain airbag 210. Sides 241 of pocket 240 has been formed using conventional one-piece woven technology to form a closed pocket. Pocket 240 is configured such that its perimeter is just slightly larger than the perimeter of ramp 230. Note that the embodiment shown in FIG. 4 depicts pocket 240 as an integral part of extension 222 just like pocket 140 is shown as an integral part of extension 122.

Figure 5:
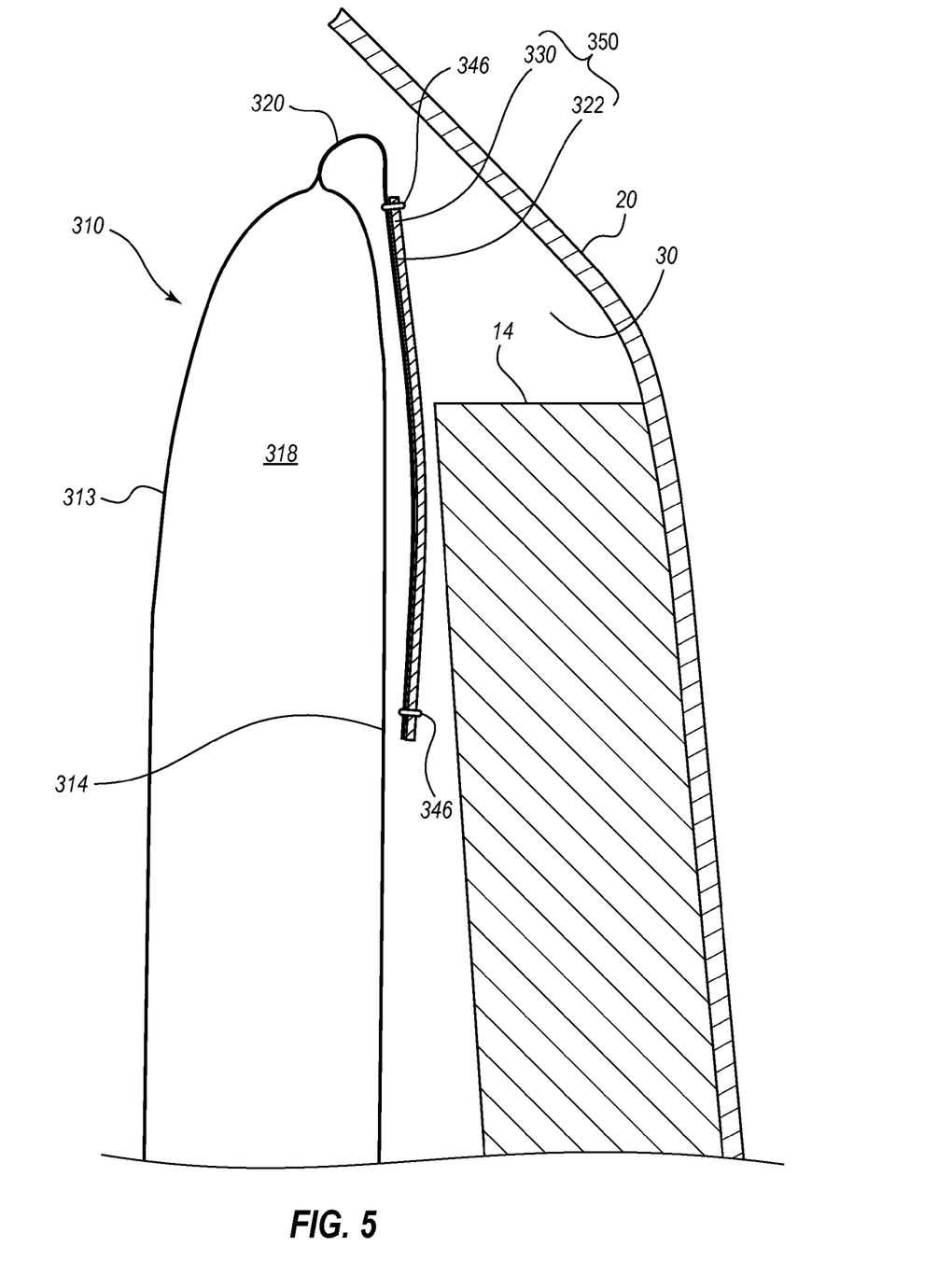
FIG. 5 is a cross-sectional view of another embodiment of an inflatable curtain airbag after the airbag has expanded.

FIG. 5 depicts another embodiment of a curtain airbag at 310 fully inflated. Curtain airbag 310 has an outboard-facing face 314 that faces toward guide 350. More particularly, outboard-facing face 314 directly faces an extension 322. Ramp 330 is attached to extension 322 via stitches 346 such that ramp 330 is directly opposite from B-pillar 14 and can contact pillar 14 during deployment. Guide 350 comprises extension 322 and ramp 330.

Figure 6:
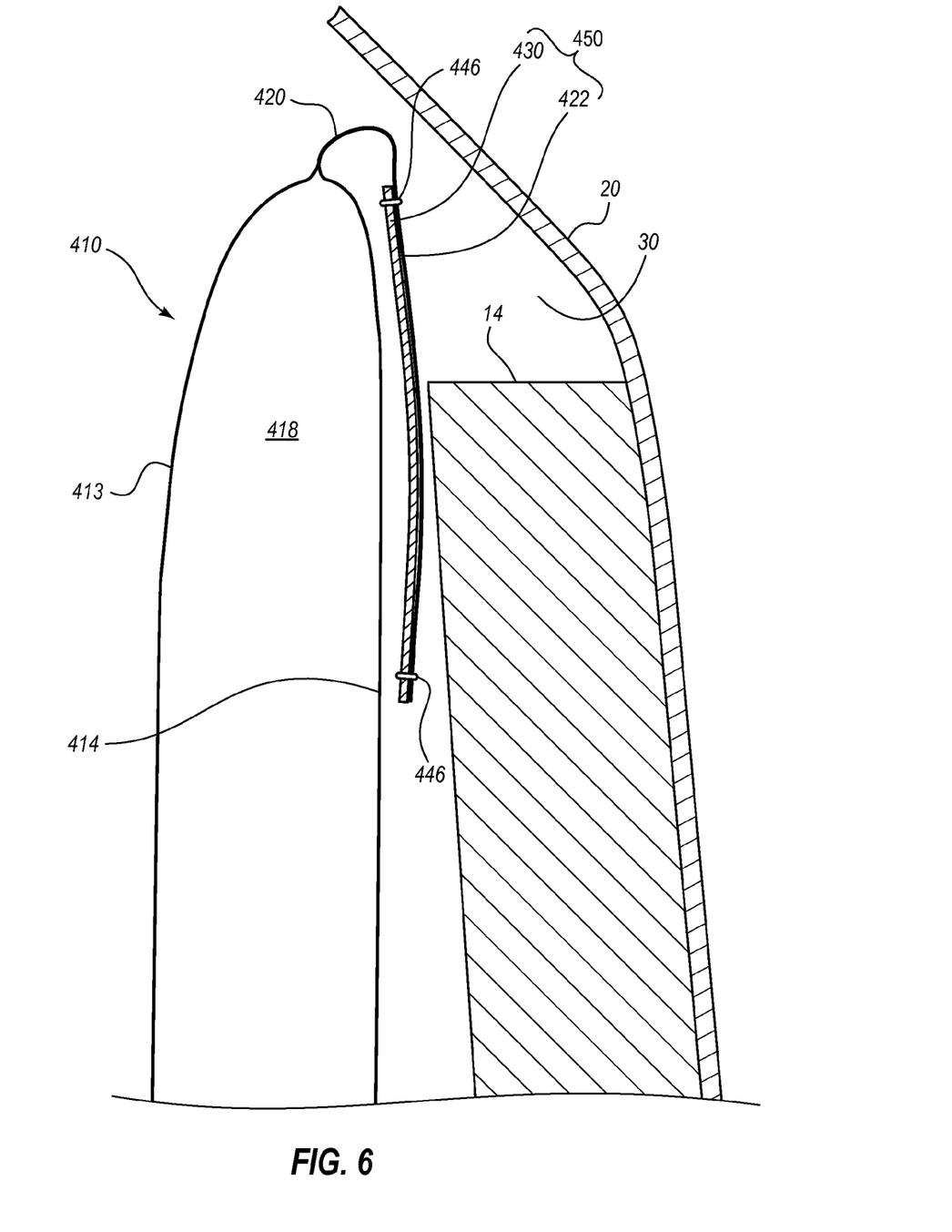
FIG. 6 is a cross-sectional view of an additional embodiment of an inflatable curtain airbag after the airbag has expanded.

The embodiment shown in FIG. 6, like the embodiment shown in FIG. 5, features a ramp 430 attached to an extension 422 via stitching 446. In this embodiment, curtain airbag 410 has an outboard-facing face 414 that faces toward guide ramp 430. Extension 422 is directly opposite from B-pillar 14 and can contact pillar 14 during deployment. Guide 450 comprises extension 422 and ramp 430.

Figure 7:
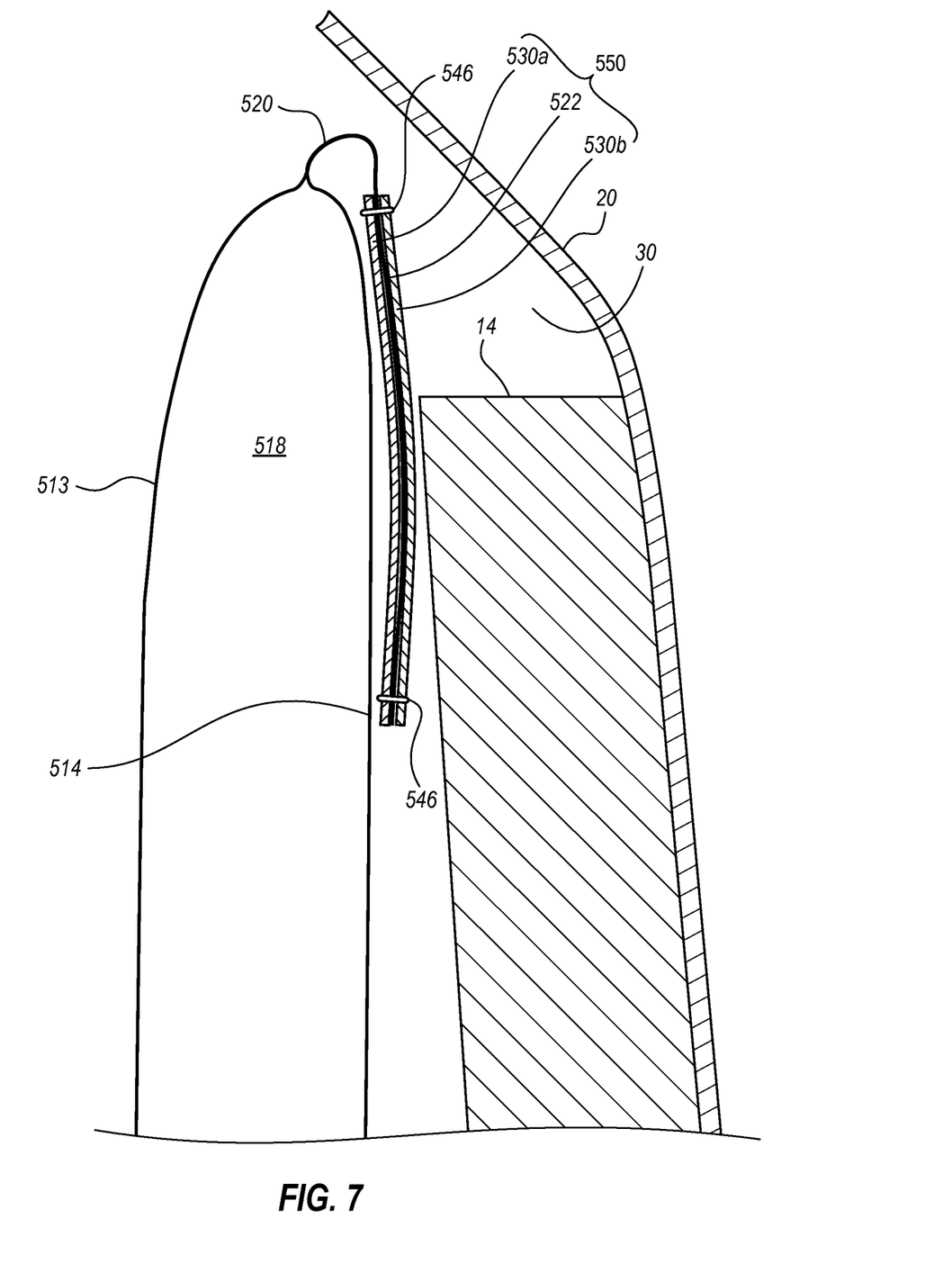
FIG. 7 is a cross-sectional view of yet another embodiment of an inflatable curtain airbag after the airbag has expanded.

FIG. 7 depicts an additional embodiment of a curtain airbag at 510 fully inflated. Curtain airbag 510 has an outboard-facing face 514 that faces toward guide 550. More particularly, outboard-facing face 314 directly faces a first ramp 530a. An extension 522 is sandwiched between first ramp 530a and second ramp 530b. Second ramp 530b is directly opposite from B-pillar 14 and can contact pillar 14 during deployment. First ramp 530a, extension 522 and second ramp 530b are connected together via stitches 446. Guide 550 comprises first ramp 530a, extension 522 and second ramp 530b. However, other fasteners can also be used alone or in combination with stitches such as a clip or an adhesive.

The embodiments of the inflatable curtain airbag assembly depicted at 110, 210, 310, 410 and 510 feature an extension coupled to an inflatable curtain airbag at an upper portion of the inflatable curtain airbag. These embodiments depict an extension coupled to the inflatable curtain airbag via a non-inflatable bridge, however, other configurations are also possible. The embodiments of the extensions depicted at 122 and 222 are each coupled to a ramp. More particularly, extensions 122 and 222 each comprise a pocket that holds a ramp, as discussed above. Together, each ramp in a pocket comprises a pillar guide. Similarly, the combination of a ramp coupled to an extension without a pocket also provides a pillar guide as exemplified by the assemblies depicted at 310, 410 and 510.

Each guide is located and configured such that, upon deployment of the inflatable curtain airbag, the pillar guide is positioned outboard with respect to the inflatable curtain airbag such that the pillar guide spans over a top of a pillar of a vehicle during an early stage of inflation of the inflatable curtain airbag. Each ramp is sufficiently flexible to be folded or rolled when stored and mounted for use and to be unfolded or unrolled upon deployment of the inflatable curtain. Additionally, each ramp is sufficiently rigid to guide the deployment of the inflatable curtain airbag to minimize interference between the inflatable curtain airbag and the pillar.

Each ramp disclosed herein is non-inflatable, semi-flexible and semi-rigid. Each disclosed embodiment of a ramp is sufficiently rigid to prevent the curtain airbag from entering a void defined by the top of the pillar and a headliner of the vehicle. Also, each disclosed embodiment of a ramp is sufficiently rigid to enable the curtain airbag to push against the ramp via the extension or the pocket without being pushed substantially into the void. Additionally, each ramp is sufficiently flexible to be unfolded or unrolled after being folded or rolled around the upper portion when stored and mounted for use, such that upon deployment of the inflatable curtain airbag the ramp has a relatively vertical orientation.

One skilled in the art will recognize that a variety of configurations of semi-rigid, semi-flexible, non-inflatable ramps may be used without departing from the spirit of the present disclosure. For example, the ramp may not be rectangular. Further, the thickness of the ramp may vary depending on the particular plastic or metal that is used. Also various configurations of extensions and pockets are also within the scope of this disclosure.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable curtain airbag assembly, comprising:
   an inflatable curtain airbag,
      wherein the inflatable curtain airbag comprises a lower portion and an upper portion that is above the lower portion after deployment of the inflatable curtain airbag,
      wherein the inflatable curtain airbag comprises an inboard-facing face and an outboard-facing face; and
   a pillar guide comprising a non-inflatable, semi-flexible, semi-rigid ramp coupled to an extension of the inflatable curtain airbag to move with the extension from a packaged state to a deployed state,
      wherein the extension is coupled to the inflatable curtain airbag at the upper portion of the inflatable curtain airbag,
      wherein the pillar guide is located and configured such that, upon deployment of the inflatable curtain airbag, the pillar guide is positioned outboard with respect to the inflatable curtain airbag such that the pillar guide spans over a top of a pillar of a vehicle during an early stage of inflation of the inflatable curtain airbag,
      wherein the ramp is sufficiently flexible to be folded or rolled when stored and mounted for use in the packaged state and to be unfolded or unrolled to the deployed state upon deployment of the inflatable curtain airbag,
      wherein the ramp is sufficiently rigid to guide the deployment of the inflatable curtain airbag to minimize interference between the inflatable curtain airbag and the pillar, and
      wherein both the ramp and the extension of the inflatable curtain are rolled or folded around the inflatable curtain airbag when in the packaged state and are both configured to be unfolded or unrolled together to the deployed state in which both the ramp and the extension span over the top of the pillar of the vehicle.

2. The inflatable airbag assembly of claim 1, wherein the extension comprises a pocket comprising two opposing sides, wherein the ramp is located within the pocket.

3. The inflatable airbag assembly of claim 2, wherein the pocket has an opening that is closed with a closure to confine the ramp within the pocket.

4. The inflatable airbag assembly of claim 2, wherein the ramp is woven into the pocket.

5. The inflatable airbag assembly of claim 1, wherein the ramp is coupled to the extension via stitching.

6. The inflatable airbag assembly of claim 1, wherein the inflatable curtain airbag has an outboard-facing face that faces toward the extension.

7. The inflatable airbag assembly of claim 1, wherein the inflatable curtain airbag has an outboard-facing face that faces toward the ramp.

8. The inflatable airbag assembly of claim 1, further comprising a second ramp, wherein the extension is positioned between the ramp and the second ramp, wherein the inflatable curtain airbag has an outboard-facing face that faces toward the ramp.

9. The inflatable airbag assembly of claim 1, wherein a void is defined by the top of the pillar and a headliner of the vehicle, wherein the ramp is sufficiently rigid to prevent the curtain airbag from entering the void.

10. The inflatable airbag assembly of claim 1, wherein a void is defined by the top of the pillar and a headliner of the vehicle, wherein the ramp is sufficiently rigid to enable the curtain airbag to push against the ramp via the extension without being pushed substantially into the void.

11. The inflatable airbag assembly of claim 1, wherein the ramp is folded or rolled around the upper portion when stored and mounted for use, and wherein the ramp is sufficiently flexible to be unfolded or unrolled upon deployment of the inflatable curtain airbag and to have a relatively vertical orientation.

12. The inflatable airbag assembly of claim 1, wherein the extension is coupled to the inflatable curtain airbag via a bridge that is non-inflatable.

13. An inflatable curtain airbag assembly, comprising:
   an inflatable curtain airbag,
      wherein the inflatable curtain airbag comprises a lower portion and an upper portion that is above the lower portion after deployment of the inflatable curtain airbag,
      wherein the inflatable curtain airbag comprises an inboard-facing face and an outboard-facing face; and
   a pillar guide comprising a non-inflatable, semi-flexible, semi-rigid ramp positioned within a pocket,
      wherein the pocket is coupled to the upper portion at a location and with a configuration that enables the pillar guide, upon deployment of the inflatable curtain airbag, to be deployed outboard with respect to the inflatable curtain airbag such that the pillar guide is facing the outboard-facing face and such that the pillar guide spans over a top of a pillar of a vehicle before inflation of the inflatable curtain airbag,
      wherein the ramp is sufficiently flexible to be folded or rolled when stored and mounted for use and to be unfolded or unrolled upon deployment of the inflatable curtain airbag, and
      wherein the ramp is sufficiently rigid for the inflatable curtain airbag to push against the ramp via the pocket, during inflation, and to guide the deployment of the inflatable curtain airbag to minimize interference between the inflatable curtain airbag and the pillar.

14. The inflatable airbag assembly of claim 13, wherein the pocket has an opening that is closed with a closure to confine the ramp within the pocket.

15. The inflatable airbag assembly of claim 13, wherein the ramp is woven into the pocket.

16. The inflatable airbag assembly of claim 13, wherein a void is defined by the top of the pillar and a headliner of the vehicle, wherein the ramp is sufficiently rigid to prevent the curtain airbag from entering the void.

17. The inflatable airbag assembly of claim 13, wherein a void is defined by the top of the pillar and a headliner of the vehicle, wherein the ramp is sufficiently rigid to enable the curtain airbag to push against the ramp via the pocket without being pushed substantially into the void.

18. The inflatable airbag assembly of claim 13, wherein the pocket is coupled to the inflatable curtain airbag via a bridge that is non-inflatable.

19. An inflatable curtain airbag assembly, comprising:
an inflatable curtain airbag,
   wherein the inflatable curtain airbag comprises a lower portion and an upper portion that is above the lower portion after deployment of the inflatable curtain airbag,
   wherein the upper portion is rolled or folded around the lower portion when the assembly is stored and ready for use,
   wherein the inflatable curtain airbag comprises an inboard-facing face and an outboard-facing face; and
a pillar guide comprising a non-inflatable, semi-flexible, semi-rigid ramp positioned within a pocket,
   wherein the pocket is coupled to the upper portion at a location and with a configuration that enables the pillar guide, upon deployment of the inflatable curtain airbag, to be deployed outboard with respect to the inflatable curtain airbag such that the pillar guide is facing the outboard-facing face and such that the pillar guide spans over a top of a pillar of a vehicle before inflation of the inflatable curtain airbag,
   wherein the ramp is folded or rolled around the upper portion when stored and mounted for use,
   wherein the ramp is sufficiently flexible to be unfolded or unrolled upon deployment of the inflatable curtain airbag and to have a relatively vertical orientation, and
   wherein the ramp is sufficiently rigid for the inflatable curtain airbag to push against the ramp via the pocket, during inflation, and to guide the deployment of the inflatable curtain airbag to minimize interference between the inflatable curtain airbag and the pillar.

20. The inflatable airbag assembly of claim 19, wherein the pocket has an opening that is closed with a closure to confine the ramp within the pocket.

21. The inflatable airbag assembly of claim 19, wherein the ramp is woven into the pocket.

22. The inflatable airbag assembly of claim 19, wherein a void is defined by the top of the pillar and a headliner of the vehicle, wherein the ramp is sufficiently rigid to prevent the curtain airbag from entering the void.

23. The inflatable airbag assembly of claim 19, wherein a void is defined by the top of the pillar and a headliner of the vehicle, wherein the ramp is sufficiently rigid to enable the curtain airbag to push against the ramp via the pocket without being pushed substantially into the void.

24. The inflatable airbag assembly of claim 19, wherein the pocket is coupled to the inflatable curtain airbag via a bridge that is non-inflatable.

25. The inflatable airbag assembly of claim 19,
   wherein the inflatable curtain airbag has sufficient length to span across at least three pillars,
   wherein the pocket is coupled to the upper portion at a location and with a configuration that enables the pillar guide, upon deployment of the inflatable curtain airbag, to be deployed outboard with respect to the inflatable curtain airbag such that the pillar guide is facing the outboard-facing face and such that the pillar guide spans over a top of one of a B-pillar and a C-pillar of a vehicle before inflation of the inflatable curtain airbag.

26. An inflatable curtain airbag assembly, comprising:
an inflatable curtain airbag,
   wherein the inflatable curtain airbag comprises a lower portion and an upper portion that is above the lower portion after deployment of the inflatable curtain airbag,
   wherein the inflatable curtain airbag comprises an inboard-facing face and an outboard-facing face; and
a pillar guide comprising a non-inflatable, semi-flexible, semi-rigid ramp coupled to an extension of the inflatable curtain airbag,
   wherein the extension is coupled to the inflatable curtain airbag at the upper portion of the inflatable curtain airbag,
   wherein the pillar guide is located and configured such that, upon deployment of the inflatable curtain airbag, the pillar guide is positioned outboard with respect to the inflatable curtain airbag such that the pillar guide spans over a top of a pillar of a vehicle during an early stage of inflation of the inflatable curtain airbag,
   wherein the ramp is sufficiently flexible to be folded or rolled when stored and mounted for use and to be unfolded or unrolled upon deployment of the inflatable curtain airbag,
   wherein the ramp is sufficiently rigid to guide the deployment of the inflatable curtain airbag to minimize interference between the inflatable curtain airbag and the pillar, and
   wherein the extension comprises a pocket comprising two opposing sides, wherein the ramp is located within the pocket.

27. The inflatable airbag assembly of claim 26, wherein the pocket has an opening that is closed with a closure to confine the ramp within the pocket.

28. The inflatable airbag assembly of claim 26, wherein the ramp is woven into the pocket.

\* \* \* \* \*